(12) United States Patent
Andreoli-Fang

(10) Patent No.: US 12,192,117 B1
(45) Date of Patent: *Jan. 7, 2025

(54) SYSTEMS AND METHODS FOR COMMON POLICY PLATFORM

(71) Applicant: CABLE TELEVISION LABORATORIES, INC., Louisville, CO (US)

(72) Inventor: Jennifer Andreoli-Fang, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,048

(22) Filed: Nov. 1, 2023

Related U.S. Application Data

(63) Continuation of application No. 17/234,583, filed on Apr. 19, 2021, now Pat. No. 11,811,677, which is a
(Continued)

(51) Int. Cl.
| | |
|---|---|
| *H04L 47/80* | (2022.01) |
| *H04L 12/14* | (2024.01) |
| *H04L 12/28* | (2006.01) |
| *H04L 47/20* | (2022.01) |
| *H04L 47/24* | (2022.01) |
| *H04L 65/1069* | (2022.01) |
| *H04L 65/80* | (2022.01) |
| *H04L 67/141* | (2022.01) |

(Continued)

(52) U.S. Cl.
CPC ........ *H04L 47/805* (2013.01); *H04L 12/1407* (2013.01); *H04L 12/2801* (2013.01); *H04L 12/2885* (2013.01); *H04L 12/2892* (2013.01); *H04L 47/20* (2013.01); *H04L 47/24* (2013.01); *H04L 65/1069* (2013.01); *H04L 65/80* (2013.01); *H04L 67/141* (2013.01); *H04L 67/61* (2022.05); *H04M 15/66* (2013.01); *H04W 4/24* (2013.01); *H04W 28/0252* (2013.01)

(58) Field of Classification Search
CPC ............... H04L 47/805; H04L 12/1407; H04L 12/2801; H04L 12/2885; H04L 12/2892; H04L 47/20; H04L 47/24; H04L 65/1069; H04L 65/80; H04L 67/141; H04L 67/61; H04M 15/66; H04W 4/24; H04W 28/0252

See application file for complete search history.

(56) References Cited

U.S. PATENT DOCUMENTS

| | | | | |
|---|---|---|---|---|
| 8,184,530 B1 * | 5/2012 | Swan | ..................... | H04W 76/12 370/230 |
| 2009/0109922 A1 * | 4/2009 | Livanos | .................. | H04L 47/20 370/329 |

(Continued)

*Primary Examiner* — Chae S Lee
(74) *Attorney, Agent, or Firm* — Josh C. Snider

(57) ABSTRACT

A converged small cell communication system includes a mobile network core, a data over cable service interface specification (DOCSIS) core, and a common policy platform for managing a service flow of a user equipment within a communication vicinity of the small cell communication system. The mobile network core includes a policy engine and a packet data network gateway (PGW). The DOCSIS core includes a packetcable multimedia (PCMM) unit having a policy server and an application manager, and a cable modem termination system (CMTS).

20 Claims, 5 Drawing Sheets

Related U.S. Application Data continuation of application No. 15/934,286, filed on Mar. 23, 2018, now Pat. No. 10,986,034.

(60) Provisional application No. 62/475,343, filed on Mar. 23, 2017.

(51) Int. Cl.
  *H04L 67/61* (2022.01)
  *H04M 15/00* (2024.01)
  *H04W 4/24* (2024.01)
  *H04W 28/02* (2009.01)

(56) References Cited

U.S. PATENT DOCUMENTS

| | | |
|---|---|---|
| 2012/0287784 A1 | 11/2012 | Shatzkamer et al. |
| 2014/0056130 A1 | 2/2014 | Grayson et al. |
| 2016/0065456 A1 | 3/2016 | Muley et al. |
| 2018/0219958 A1 | 8/2018 | Bernstein et al. |

\* cited by examiner

SYSTEMS AND METHODS FOR COMMON POLICY PLATFORM

RELATED APPLICATIONS

This application is a continuation of U.S. patent application Ser. No. 17/234,583, filed Apr. 19, 2021, which application is a continuation of U.S. patent application Ser. No. 15/934,286, filed Mar. 23, 2018. U.S. patent application Ser. No. 15/934,286 claims the benefit of and priority to U.S. Provisional Patent Application Ser. No. 62/475,343, filed Mar. 23, 2017. All of these prior applications are incorporated herein by reference in its entireties.

FIELD OF THE DISCLOSURE

This disclosure relates in general to the field of communications and, more particularly, common management of cable system and mobile network operations.

BACKGROUND

Today's communication systems include separate wireless and wireline portions, each of which may be owned and controlled by the same or different operators. Even though some operators, such as cable operators, also known as Multiple System Operators (MSOs), use Data Over Cable Service Interface Specification (DOCSIS) networks for backhauling Internet traffic, separate networks, such as mobile networks, also known as Mobile Network Operators (MNOs), other DOCSIS networks, Wi-Fi networks, and radio networks have separate traffic scheduling algorithms. As a result, currently when these types of networks are combined, the resulting architecture may be inefficient and may result in higher latency due to internetwork lack of visibility and poorly managed communication.

Small cell technology utilizes low-powered cellular radio access nodes and operates in using the available spectrum within a relatively small geographical area. Small cell can operate in either an MNO (e.g., mobile core, for 3G, 4G LTE networks) or an MSO (e.g., managed DOCSIS small cell using backhaul to connect the small cells to the core network, Internet, etc.). Presently, conventional techniques to backhaul a small cell with a DOCSIS network require that all mobile traffic is treated equally, since the cable modem termination system (CMTS) does not have insight into the mobile traffic types. Even though the CMTS may be able to treat some traffic differently when the mobile network performs simple DSCP tagging, the conventional CMTS still does not give the operator full flexibility for prioritization and charging. Thus, the different solution characteristics between MSOs and MNOs have proven difficult to co-manage in a converged network.

At present, the DOCSIS network of an MSO manages each cable modem (CM), whereas the MNO manages each user equipment (UE), such as an LTE mobile device. For example, some MSOs that operate managed DOCSIS small cell (i.e., a small cell (eNodeB) backhauled using a DOCSIS network) also own and operate the mobile network that serves the UE. Such co-owned operations will therefore have two different solution characteristics and/or protocols for serving the same UE, which may create scheduling conflicts for the UE data flow, and also render optimal charging difficult. With an increasing number of MSOs becoming or acquiring MNOs, the disparity between these solutions further complicates network management. Accordingly, there is a need for a converged DOCSIS and mobile core architecture that implements a common policy platform.

SUMMARY

In an embodiment, a converged small cell communication system includes a mobile network core, a data over cable service interface specification (DOCSIS) core, and a common policy platform for managing a service flow of a user equipment within a communication vicinity of the small cell communication system. The mobile network core includes a policy engine and a packet data network gateway (PGW). The DOCSIS core includes a packetcable multimedia (PCMM) unit having a policy server and an application manager, and a cable modem termination system (CMTS).

In an embodiment, a method of establishing a new session for a converged small cell using a common policy platform is provided. The method includes steps of receiving a trigger to establish a new session, forming a policy and charging control (PCC) rule for a first service data flow, binding the PCC rule to an internet protocol connectivity access network (IP-CAN) bearer, transmitting the PCC rule to a policy and charging enforcement function (PCEF) of a cable modem termination system (CMTS), and converting the PCC rule into a translated quality of service (QOS) rule. The method further includes a step of detecting, by a PCEF of a packet data network gateway (PGW) and by the PCEF of the CMTS, a second service data flow. The method further includes a step of applying to the small cell, by the PCEF of the PGW and by the PCEF of the CMTS, the translated QoS rule.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
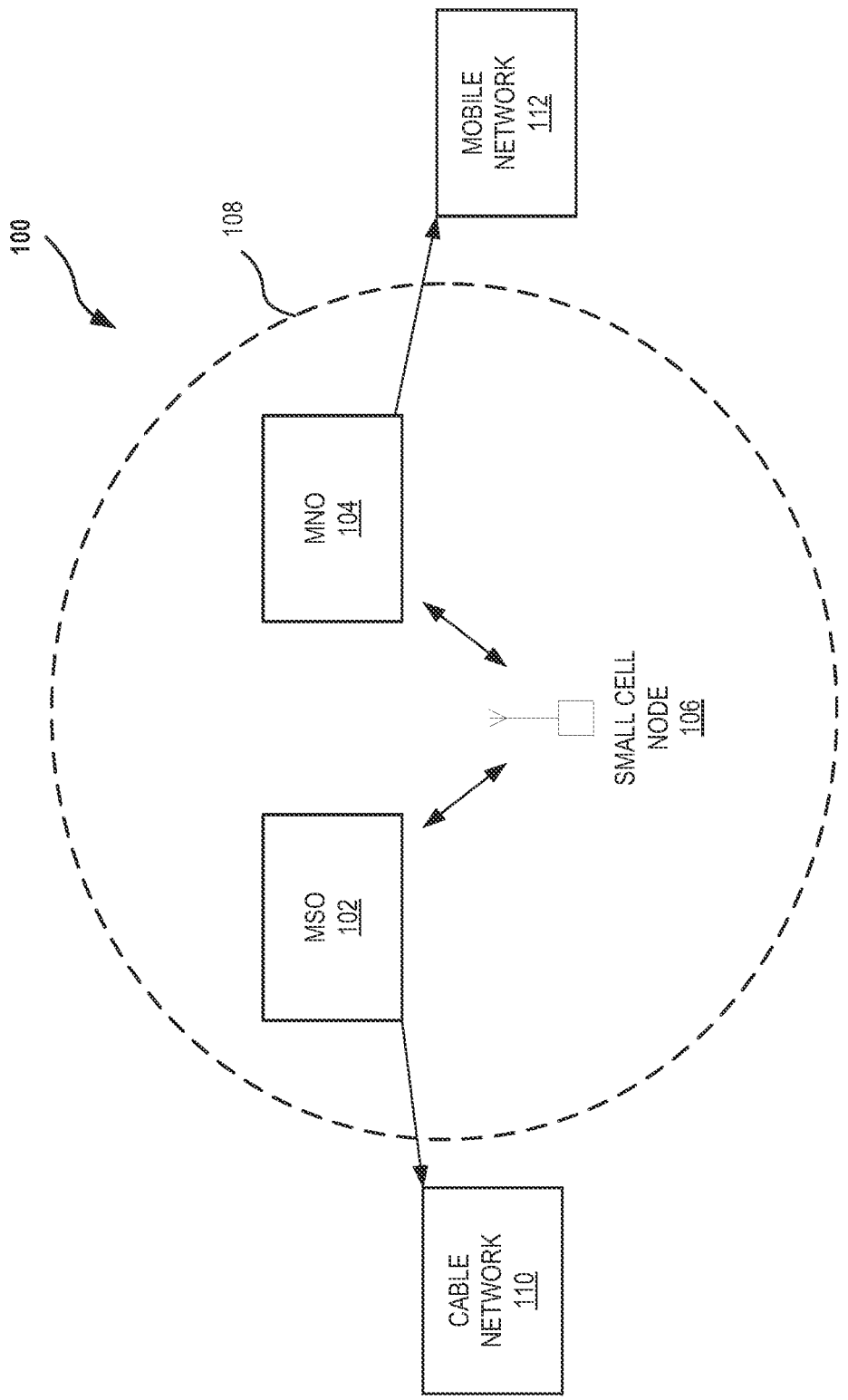
FIG. 1 illustrates an exemplary converged communications system implementing a common policy platform, in accordance with embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION OF THE FIGURES

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

According to the embodiments described further herein, a common policy platform for an integrated communications network advantageously enables an operator to (i) provide a managed DOCSIS service flow per UE for a managed DOCSIS small cell, such as an eNodeB that is backhauled using the DOCSIS network, and (ii) co-manage the UE service flow by an MSO that is operated and/or owned by the same MNO serving the UE.

By providing a managed DOCSIS service flow (SF) per UE, or per service data flow (SDF) of the UE, the operator realizes a significantly greater flexibility to prioritize UE communications based on the traffic type. The operator is also better able to more accurately determine different charging tiers for the communication traffic. According to the techniques described herein, an MSO that is also an MNO deploying a small cell backhauled using its own DOCSIS network, rather than performing quality of service (QOS) and rate limiting by using CM configuration files (which are static), the MSO can simply use a single configuration file with generic QoS and rate parameters. Furthermore, the MSO is able to manage and perform QoS control for each UE device and SDF directly, granularly, and dynamically. According to these advantageous techniques, the need to manage thousands of CM configuration files and manually configure each CM is eliminated. Each UE, or SDF of a UE, may be managed by the evolved packet core (EPC) of the evolved packet system (EPS), and each UE/SDF may be provided a matching DOCSIS SF.

In mobile core technology, the policy function of the Policy and Charging Control (PCC) architecture resides in the Policy Control and Charging Rules Function (PCRF), and the policy enforcement, or Policy and Charging Enforcement Function (PCEF) resides in the Packet Data Network (PDN) Gateway (PGW). The PCC detects a packet belonging to an SDF, identifies the applicable service, and provides charging parameters and policy control for the SDF. The PCEF selects a PCC rule for each received packet and applies a PCC rule for the applicable filter. The PCRF functions to encompass the policy control decision and flow based charging control functionalities. The PCRF provides network control regarding the SDF detection, gating, and QoS and flow based charging towards the PCEF. The PCRF provisions PCC rules to the PCEF through the Gx interface. The PCRF reports events to the Application Function (AF) through the Rx interface.

In the DOCSIS core, functional elements that are equivalent to the PCC architecture equivalent are defined by a PacketCable Multimedia (PCMM), and include a policy server (PS) and application manager (AM), which together are referred to as the PCRF, and a PCEF residing in the CMTS. However, conventional MSO networks do not deploy a PCMM. Accordingly, for case of explanation, the description below further differentiates the following PCEF examples as: PGW-PCEF in reference to the mobile PCEF elements; and CMTS-PCEF in reference to the DOCSIS PCEF elements.

In the exemplary embodiment, a common policy platform resides in the mobile network, but also manages the DOCSIS network. That is, according to the systems and methods herein, each UE, or SDF of a UE, is managed by the mobile PCRF, and each UE/UE SDF has a matching DOCSIS SF. Through this converged network system, a more dynamic and granular management of the traffic is realized, and the need for a PCMM in the DOCSIS core is eliminated.

FIG. 1 illustrates an exemplary converged communications system 100 implementing a common policy platform (e.g., common policy platform 206, FIG. 2, below). System 100 includes at least one multiple system operator (MSO) 102 and at least one mobile network operator (MNO) 104 within the operational geographic vicinity 106 of a small cell node 108. Small cell node 108 includes, for example, an evolved Node B (eNodeB, or eNB), and may communicate with a UE (not shown) within vicinity 106 according to the LTE protocols of MNO 104 or by backhauling using the DOCSIS network of MSO 102. In the exemplary embodiment, MSO 102 and MNO 104 are managed by the same owner/operator, and MSO 102 is in communication with a cable network 110, and MNO 104 is in communication with a mobile network 112. In exemplary operation of system 100, management of small cell node 108 is according to the common policy platform (e.g., common policy platform 206, FIG. 2, below) of the embodiments herein.

Figure 2:
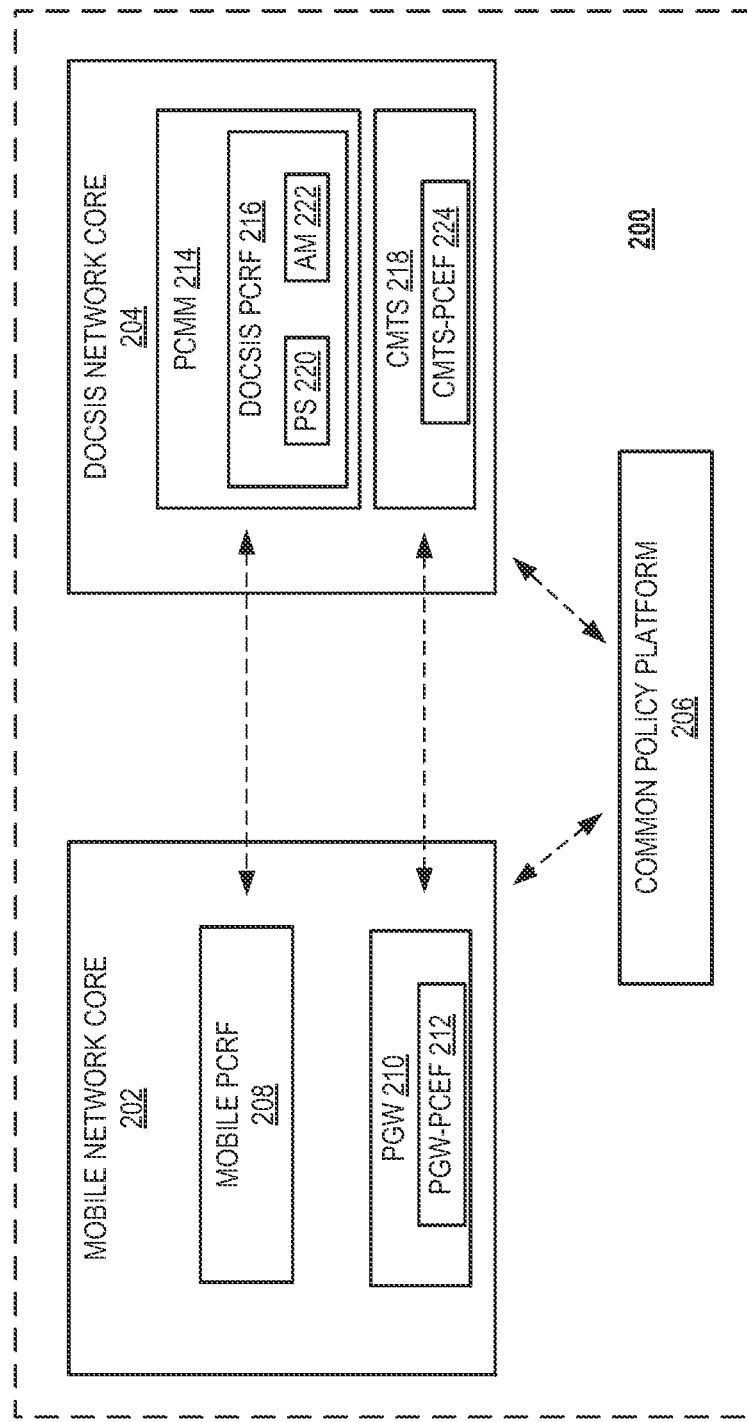
FIG. 2 depicts a simplified block diagram of a converged network architecture for managing communications of a mobile network core and a DOCSIS network core using a common policy platform, in accordance with an embodiment.

FIG. 2 depicts a simplified block diagram of a converged network architecture 200 for managing communications of a mobile network core 202 and a DOCSIS network core 204 using a common policy platform 206. In the exemplary embodiment, mobile network core 202 includes a mobile PCRF 208 and a PGW 210. In an exemplary operation of converged network architecture 200, mobile PCRF 208 interfaces with the main packet gateway and takes charging enforcement decisions on its behalf. That is, mobile PCRF 208 is responsible for policy functions. Additionally, PGW 210 includes a PGW-PCEF 212 and receives the QoS information for each bearer from mobile PCRF 208 and enforces the QoS rules in order to ensure that each traffic flow is receiving an equitable share of the network resources. That is, PGW 210 is responsible for policy enforcement.

Further to the exemplary embodiment, DOCSIS network core 204 includes a PCMM 214 and a CMTS 216. PCMM 214 includes a DOCSIS PCRF 218, which includes a PS 220 and an AM 222. CMTS 216 includes a CMTS-PCEF 222. PCMM 214 is responsible for policy functions and CMTS 218 is responsible for policy enforcement. In exemplary operation of converged network architecture 200, mobile network core 202 and DOCSIS network core 204 are converged, and co-managed according to common policy platform 206.

Figure 3:
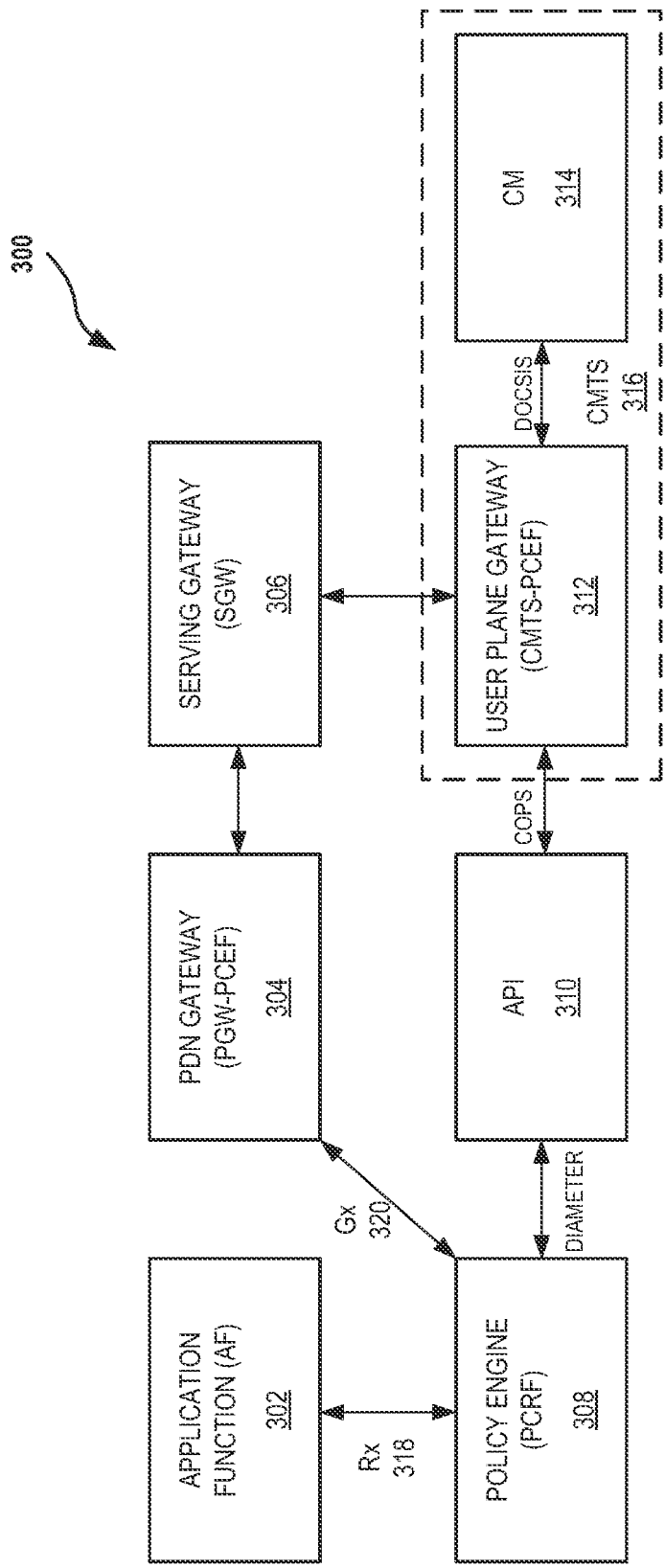
FIG. 3 illustrates a simplified block diagram of an exemplary policy and charging control (PCC) architecture implementing the common policy platform depicted in FIG. 2, in accordance with an embodiment.

FIG. 3 illustrates a simplified block diagram of an exemplary PCC architecture 300 implementing common policy platform 206, FIG. 2. PCC architecture 300 includes an AF 302, a PGW 304, a Serving Gateway 306, a Policy Engine 308 (e.g., including a PCRF), an application programming interface (API) 310, and a User Plane Gateway 312 (including a CMTS-PCEF, e.g., CMTS-PCEF 224, FIG. 2) and a CM 314 of a CMTS 316. API 310 may be separate from CMTS 316, or co-located with CMTS 316. In exemplary operation, AF 302 is in operable communication with policy engine 308 over an Rx interface 318. In contrast to conventional techniques though, the PCRF of policy engine 308 is also in operable communication with the PGW-PCEF of PGW 304 over a Gx interface 320. PGW 304 also communicates with SGW 306, and policy engine 308 communicates with CMTS 316 through API 310. In at least one embodiment, the novel Gx interface 320 implements a Diameter protocol, in accordance with Diameter protocols used in different conventional interfaces.

Figure 4:
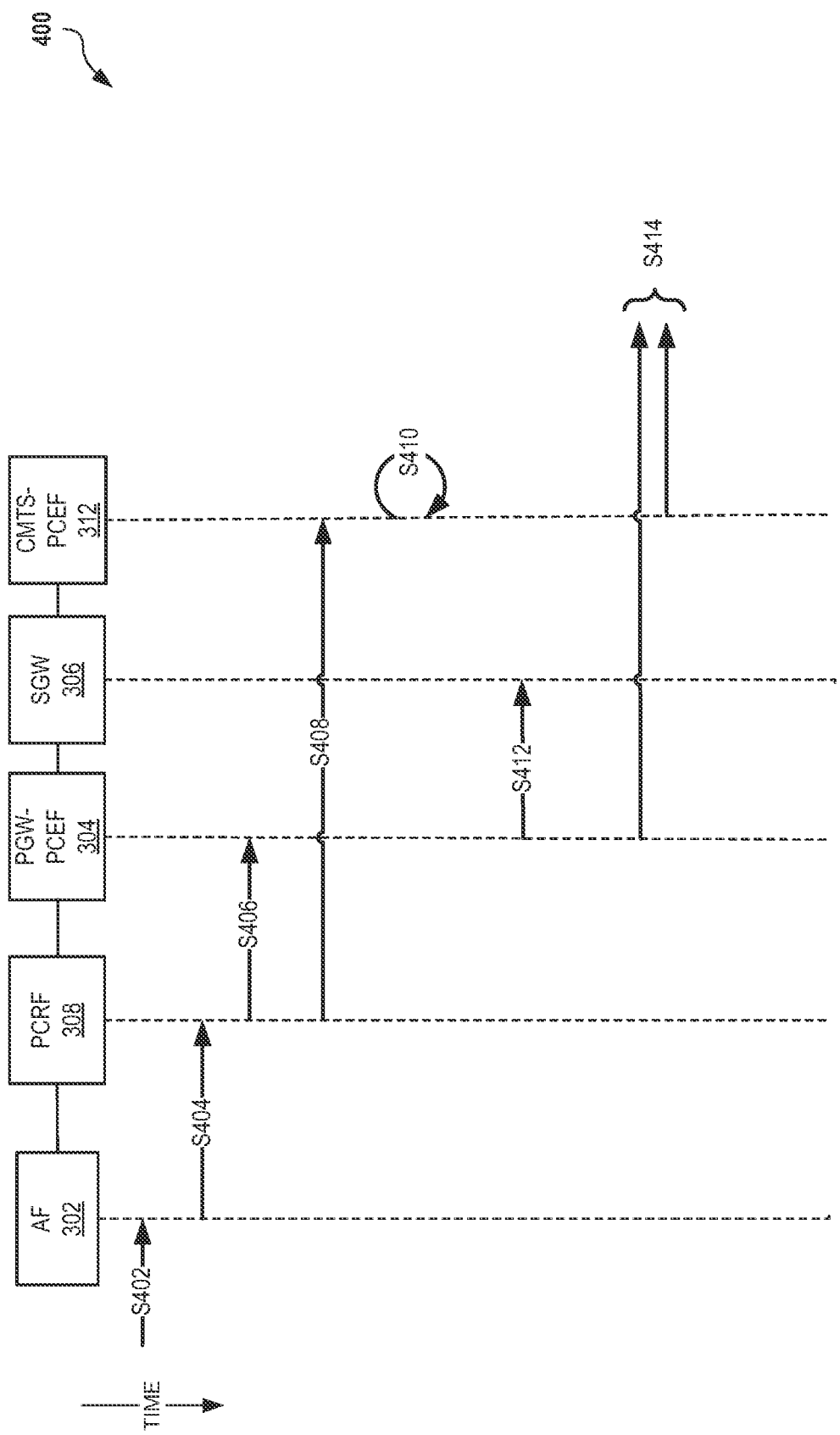
FIG. 4 is a sequence diagram illustrating a call flow of an exemplary session establishment process for the PCC architecture depicted in FIG. 3.

FIG. 4 is a sequence diagram illustrating a call flow of an exemplary session establishment process 400, for PCC architecture 300, FIG. 3. In the exemplary embodiment, process 400 is implemented utilizing one or more of the elements of PCC architecture 300, including without limitation AF 302, PCRF 308, PGW-PCEF 304, SGW 306, and CMTS-PCEF 312. When implemented, process 400 may execute the following steps, which are not necessarily required to be in the order listed, except where so clearly designated as being dependent on a prior step.

Process 400 begins at step S402. In step S402, AF 302 receives a trigger to establish a new session, a similar manner as in conventional techniques. In step S404, AF 302 sends a signal to PCRF 308. In the exemplary embodiment, step S404 may also be performed according to conventional PCC procedures of a mobile network. In step S406, when an EPS/Internet Protocol Connectivity Access Network (IP-CAN) session is established or modified, PCRF 308 forms a PCC rule for the SDF based on operator policy (e.g., QoS, gate, charging, etc.), binds the formed PCC rule to the applicable IP-CAN bearer (not shown), and transmits the rule to PGW-PCEF 304. In the exemplary embodiment, steps S402 through S406 may be performed along the lines of conventional PCC techniques.

In step S408, in contrast to conventional techniques, PCRF 308 additionally transmits the PCC rule, or rules, to CMTS-PCEF 312 for IP-CAN bearer mapping. Step S410 is also an innovative departure from conventional techniques. In step S410, an API (e.g., API 310, FIG. 3) of CMTS 312 converts (i) the PCC rules into CMTS QoS rules that can be used by the DOCSIS scheduler, and (ii) the IP-CAN bearer ID into a DOCSIS SFID/SID.

In step S412, on non-DOCSIS entities, PGW-PCEF 304 binds the SDF QoS and the IPCAN bearer QoS, and further applies the QoS to the IP-CAN bearer (e.g., set/modify the IP-CAN bearer context at EPS entities, such as the UE, the eNB, and/or SGW 306). An exemplary embodiment, step S412 may be implemented in accordance with conventional procedures.

Step S414 though, is also a departure from conventional techniques. In step S414, both PGW-PCEF 304 and CMTS-PCEF 312 detect an SDF, and each of PGW-PCEF 304 and CMTS-PCEF 312 applies the same or translated PCC rules formed/generated in previous steps. In an exemplary embodiment, CMTS 312 is further optionally configured to track the IP-CAN bearer ID-SFID mapping, in the case of a subsequent policy modification.

Figure 5:
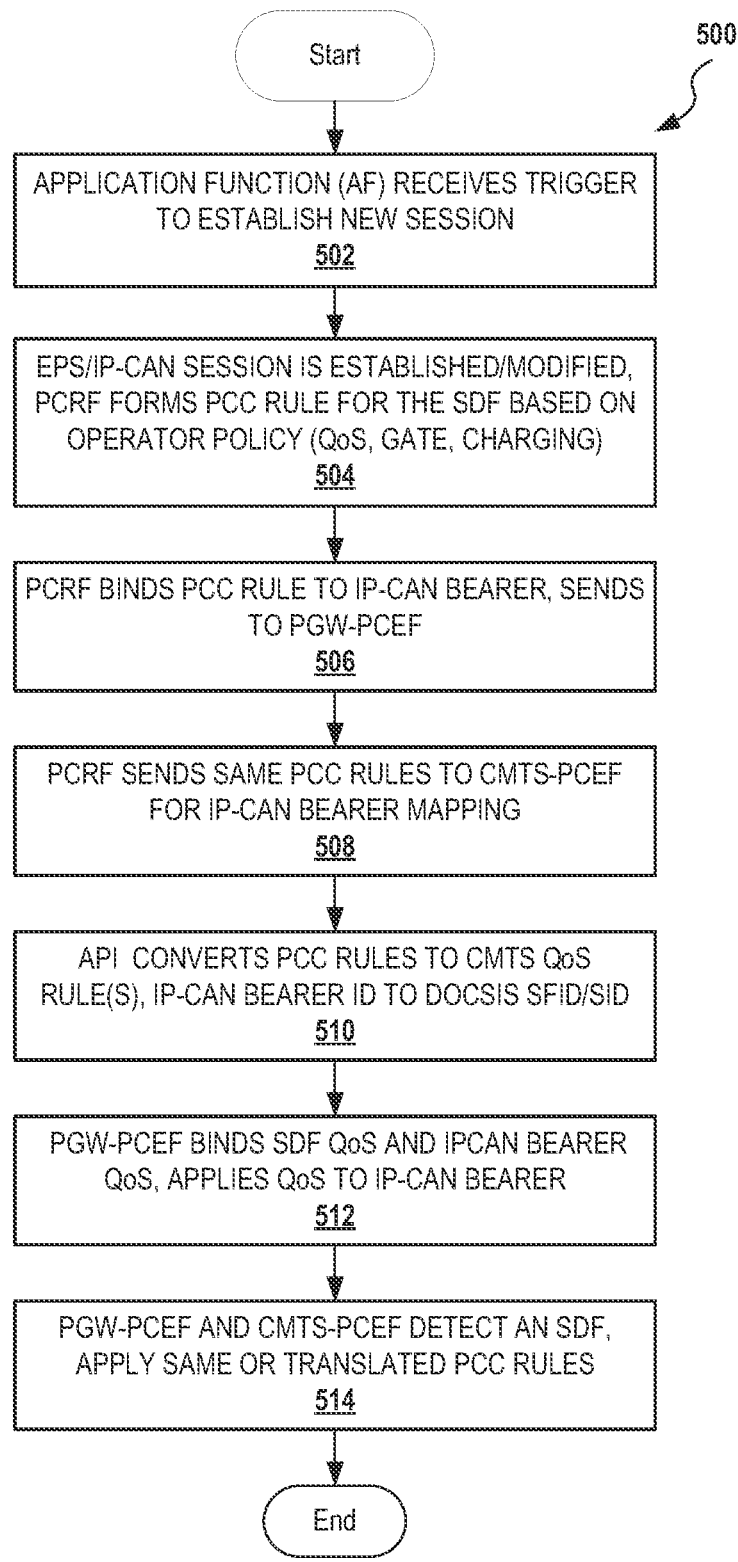
FIG. 5 is a flow chart diagram of an exemplary common policy management process that may be implemented with one or more of the embodiments depicted in FIGS. 1-4.

FIG. 5 is a flow chart diagram of an exemplary common policy management process 500 that may be implemented with one or more of the embodiments herein. Process 500 begins at step 502. In step 502, an AF (e.g., AF 302, FIG. 3) receives a trigger to establish a new session. In step 504, when an EPS/IP-CAN session is established or modified, a PCRF (e.g., PCRF 308, FIG. 3) forms PCC rule for the applicable SDF based on operator policy (e.g., QoS, gate, charging, etc.). In step 506, the PCRF binds the PCC rule to the IP-CAN bearer, and sends the rule to the PGW-PCEF (e.g., PGW-PCEF 304, FIG. 3). In step 508, the PCRF sends the same PCC rule, or rules, to the CMTS-PCEF (e.g., CMTS-PCEF 312, FIG. 3) for IP-CAN bearer mapping. In step 510, an API (e.g. API 310, FIG. 3) of the CMTS (e.g., CMTS 316, FIG. 3) converts (i) the PCC rules to CMTS QoS rules that can be used by the DOCSIS scheduler, and (ii) the IP-CAN bearer ID to a DOCSIS SFID/SID. In step 512, on non-DOCSIS entities, the PGW-PCEF binds the SDF QoS and the IPCAN bearer QoS, and applies the QoS to the IP-CAN bearer (e.g., set/modify IP-CAN bearer context at EPS entities: UE/eNB/SGW/etc.). In step 514, both the PGW-PCEF and the CMTS-PCEF detect an SDF, each of the PGW-PCEF and the CMTS-PCEF applies same or translated PCC rules.

Exemplary embodiments of systems and methods for a common policy platform are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other managed communication networks.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An apparatus for establishing a converged small cell session using a common policy platform, comprising:
   a processor; and
   a memory configured to store computer executable instructions therein, which, when executed by the processor, cause the apparatus to:
      receive a trigger to establish a new session;
      form a policy and charging control (PCC) rule for a first service data flow;
      bind the PCC rule to an internet protocol connectivity access network (IP-CAN) bearer;
      transmit the PCC rule to a policy and charging enforcement function (PCEF) of a modem termination system (MTS);
      convert the PCC rule into a translated quality of service (QOS) rule;
      detect a second service data flow; and
      apply the translated QoS rule to the small cell.

2. The apparatus of claim 1, wherein the instructions further cause the apparatus to detect the second service data flow in cooperation with at least one of the PCEF of the MTS and a PCEF of a packet data network gateway (PGW) in communication with the processor.

3. The apparatus of claim 2, wherein the instructions further cause the apparatus to apply the translated QoS to the small cell in cooperation with at least one of the PCEF of the MTS and the PCEF of the PGW.

4. The apparatus of claim 1, wherein the instructions further cause the apparatus to transmit the same PCC rule to the PCEF of the MTS and the IP-CAN bearer for mapping.

5. The apparatus of claim 1, wherein the instructions further cause the apparatus to convert an ID of the IP-CAN bearer to a DOCSIS SFID/SID.

6. The apparatus of claim 1, wherein the instructions further cause the apparatus to detect the second service data flow concurrently with the conversion of the PCC rule.

7. The apparatus of claim 1, wherein the instructions further cause the apparatus to bind a service data flow QoS and an IP-CAN bearer QoS.

8. The apparatus of claim 7, wherein the IP-CAN bearer QoS is an evolved packet system entity including one or more of a user equipment, an evolved Node B, and a serving gateway.

9. An apparatus for a converged small cell communication system, comprising:
   a common policy platform for managing a service flow of a user equipment device (UE) operating within a communication vicinity of the small cell communication system;
   a converter configured for communication with a policy engine of a mobile network core having a first policy and charging enforcement function (PCEF); and
   a second PCEF configured to receive, from the policy engine, a policy and charging control (PCC) rule for the service flow based on an implementation of the common policy platform by the policy engine,
   wherein the converter is further configured to convert the PCC rule to a format of a data over cable service interface specification (DOCSIS) core, and
   wherein the second PCEF is further configured to (i) detect the service flow of the UE, and (ii) apply the converted PCC rule from the converter to the detected service flow.

10. The apparatus of claim 9, wherein the policy engine includes a mobile policy control and charging rules function (PCRF).

11. The apparatus of claim 9, wherein the mobile network core includes a packet data network gateway (PGW).

12. The apparatus of claim 11, further configured for operable communication with a serving gateway (SGW).

13. The apparatus of claim 9, further configured for operable communication with the first PCEF, though the policy engine, over a Gx interface.

14. The apparatus of claim 13, wherein the Gx interface is configured to implement a Diameter protocol.

15. The apparatus of claim 9, wherein the DOCSIS core includes a third PCEF having a policy server and an application manager.

16. The apparatus of claim 9, further comprising a processor.

17. The apparatus of claim 16, wherein the converter is located remotely from the processor.

18. The apparatus of claim 16, wherein the converter is co-located proximate with the processor.

19. The apparatus of claim 9, further configured such that the policy engine is enabled to trigger a new session upon receipt of a trigger from an application function over an Rx interface.

20. The apparatus of claim 9, further configured for communication with a modem.

* * * * *